May 17, 1932.  M. J. B. BARBAROU  1,858,798
CONNECTING ROD OF ENGINES WITH RADIALLY ARRANGED CYLINDERS
Filed June 4, 1929    2 Sheets-Sheet 1

Marius Jean-Baptiste Barbarou
INVENTOR;
By (signature)
his Attorney.

May 17, 1932. M. J. B. BARBAROU 1,858,798
CONNECTING ROD OF ENGINES WITH RADIALLY ARRANGED CYLINDERS
Filed June 4, 1929 2 Sheets-Sheet 2

Marius Jean-Baptiste Barbarou
INVENTOR:
By
his Attorney.

Patented May 17, 1932

1,858,798

UNITED STATES PATENT OFFICE

MARIUS JEAN-BAPTISTE BARBAROU, OF PARIS, FRANCE

CONNECTING ROD OF ENGINES WITH RADIALLY ARRANGED CYLINDERS

Application filed June 4, 1929, Serial No. 368,400, and in France July 5, 1928.

The present invention relates to improvements in the connecting rods of engines with radially arranged cylinders, and it more particularly concerns the mounting of the master connecting rod on a crankshaft of such an engine.

In the known constructions, the bolts or studs for securing the cap of the master connecting rod to the body of said rod are situated at a certain distance from the crank pin of the crankshaft, upon which the said master connecting rod is secured, and in like manner, the pivot pins for the small connecting rods to the master connecting rod are separated by some distance from the axis of the crank pin, and it is therefore necessary to provide a master connecting rod of a relatively large size, which will consequently have a heavy weight. Moreover, in view of the distance between the crank pin and the bolts or studs securing the cap to the body of the master connecting rod, the clamping of the crank pin by the master connecting rod is defective.

In the construction according to the invention, by which the above drawbacks are obviated, some of the pivot pins for the small connecting rods are apertured or recessed and the bolts or studs for securing the cap of the master connecting rod to the body thereof extend through said pins, whereby said bolts may be located near the axis of the crank pin of the crankshaft, and the clamping of the master connecting rod upon the crank pin will be more efficient.

According to another feature of the invention, the cap and the body of the master connecting rod are provided with interfitting portions, in order to prevent all slipping due to the oblique effort of the said bolts or studs.

In the accompanying drawings and by way of example:

Figure 1:
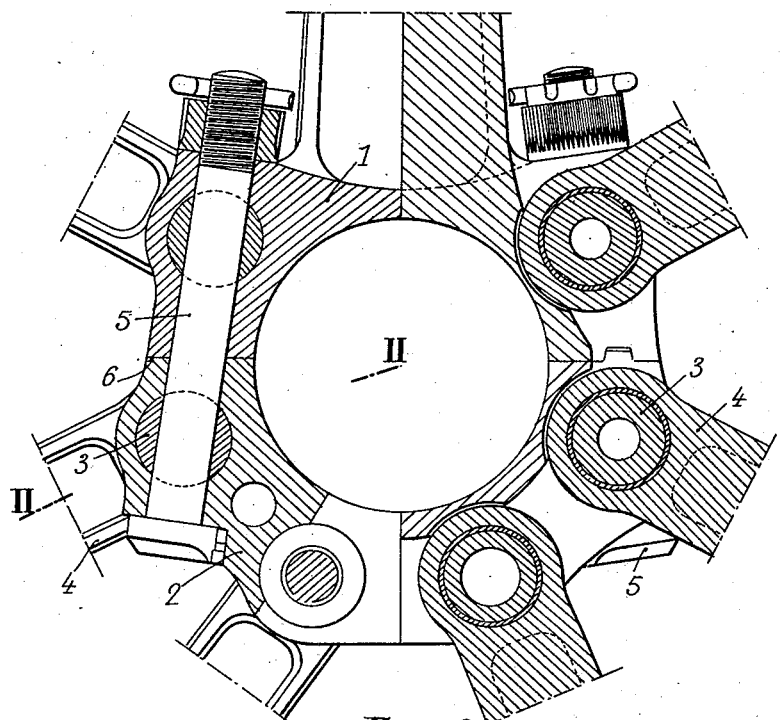
Fig. 1 is a vertical axial section on the line I—I of Fig. 2, showing an improved master connecting rod, according to the invention.
Figure 2:
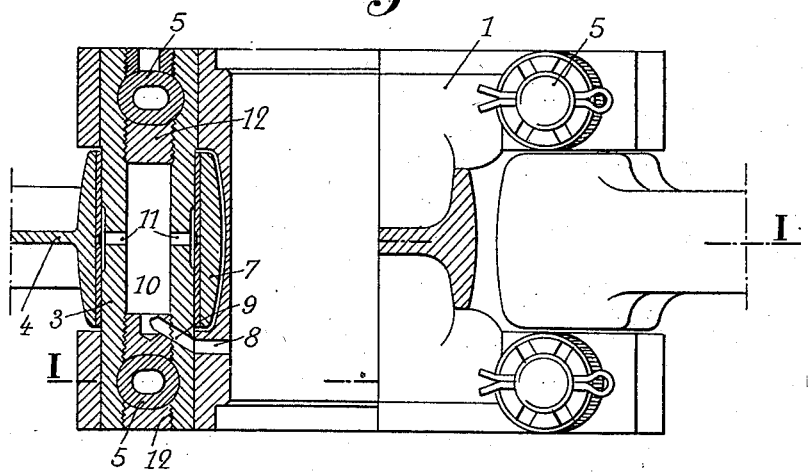
Fig. 2 is a plan view corresponding to Fig. 1, partly in section on the line II—II of Fig. 1.

In the form of construction herein represented, 1 is the main body of a master connecting rod, 2 the cap of said rod, and 3 the pins for the pivotation of the small connecting rods 4 upon the master connecting rod. The pins 3 engage wings or flanges on the body of said master connecting rod and of its cap 2, and are secured into said wings. According to the invention, the cap of the master connecting rod 2 is secured to the main body 1 of the bolts 5, which extend through the pivoting pins 3 of the small connecting rods 4. The said bolts 5 are inclined, and their inclination is determined by the position occupied by the two pins 3 on the respective sides of the joint 6 between the cap 2 and the body of the master connecting rod 1.

The heads 7 of the small connecting rods 4 are lubricated by a lubricant supplied by the bearing of the master connecting rod. For this purpose, the inner face of the master connecting rod bearing is connected to a chamber 10 formed within each pin 3, by means of two ducts 8 and 9 formed respectively in the master connecting rod and in the pin 3. The said chamber 10 is connected to the inner face of the head 7 of the small connecting rod 4, which is mounted on the corresponding pin 3, by means of two ducts 11. In the example herein represented, the pins 3 are hollow, and their ends are closed by the plugs 12. In a preferred construction, the bolts 5 are also hollow in order to reduce their weight.

Figure 3:
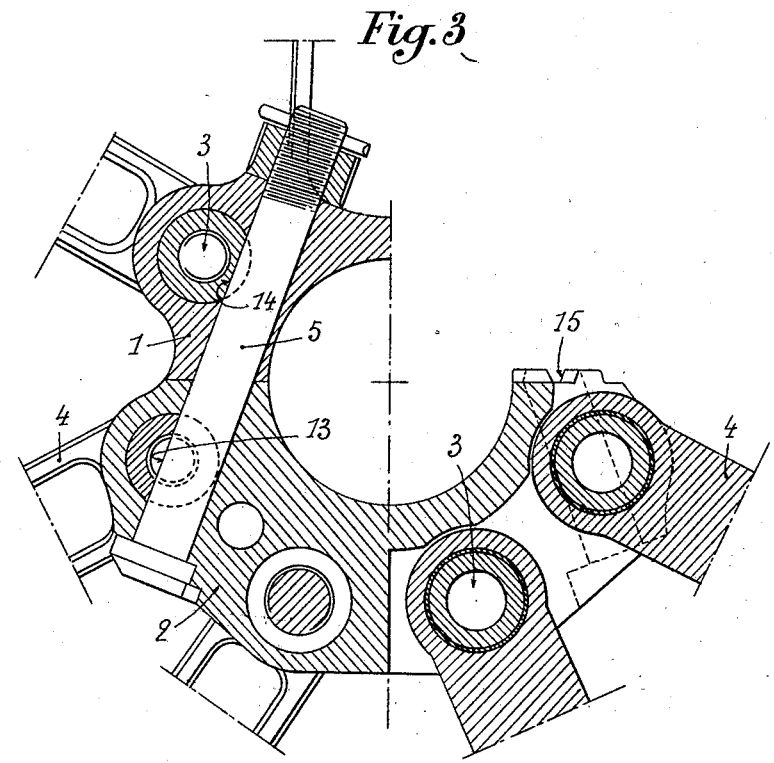
Fig. 3 is a partial section on the axis of the master connecting rod, showing an improvement, according to the present invention.
Figure 4:
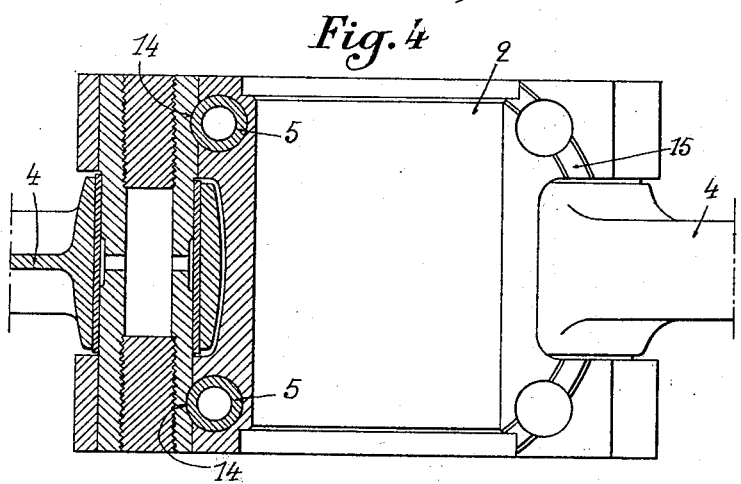
Fig. 4 is a plan view, partly in section according to a pivoting axis, showing the cut-out portion.

According to another constructional form represented in Figs. 3 and 4, the bolts 5 securing the cap 2 to the body 1 of the master connecting rod, do not extend entirely through the said pins 3, but pass through cut-out parts of the same, as shown at 13 and 14, and on the side next the crank pin. The depth of said cut-out parts is variable, and may be such that a bolt 5 is internally tangent to a pin 3, as in the case of the cut-out part 13. However, the cut-out part can be very shallow (see 14) so as not to weaken the said pin 3. The said cut-out parts should however be so provided that the bolts will extend towards one another and toward the main body of the master connecting rod.

Due to the present construction, the bolts 5 and the pins 3 can be brought within the minimum distance of the crank pin of the crankshaft, and hence the master connecting rod is more tightly held upon the said crank pin. Furthermore, the general weight of the device is reduced, this weight being brought as close as possible to the axis of the crank pin. All slipping due to the inclined position of the bolts 5 (which inclination may be as desired) may be obviated by providing on the cap and the body of the master connecting rod interfitting portions 15 (Fig. 3).

Obviously, the said invention is not limited to the form of construction herein described and represented which is given solely by way of example. If desired, the bolts 5 need not extend through the pins 3, and the said bolts might be tangent to said pins on the outside and next the crank pin. Furthermore, the bolts 5 may be replaced by studs.

Having now described my invention what I claim as new and desire to secure by Letters Patent is:

In an internal combustion engine with radially arranged cylinders, the combination of a crankshaft, a master connecting rod with a two-piece head comprising a body portion and a cap, a number of pivot pins extending through said body and said cap, a number of small connecting rods pivoted to said pivot pins, respectively, clamping bolts on either side of the crank pin for securing said cap to said body portion, the axes of each clamping bolt forming an angle different from ninety degrees with the plane of contact of said cap and body portion and converging toward the middle line of the master connecting rod, and interfitting portions in the diametral plane of contact between said cap and body portion, said interfitting portions having the shape of circular arcs.

In testimony whereof I have signed my name to this specification.

MARIUS JEAN-BAPTISTE BARBAROU.